March 28, 1967
F. W. KUSSY ETAL
3,311,793
ELECTRICAL CONTROL CENTER
Filed Sept. 28, 1964
8 Sheets-Sheet 1
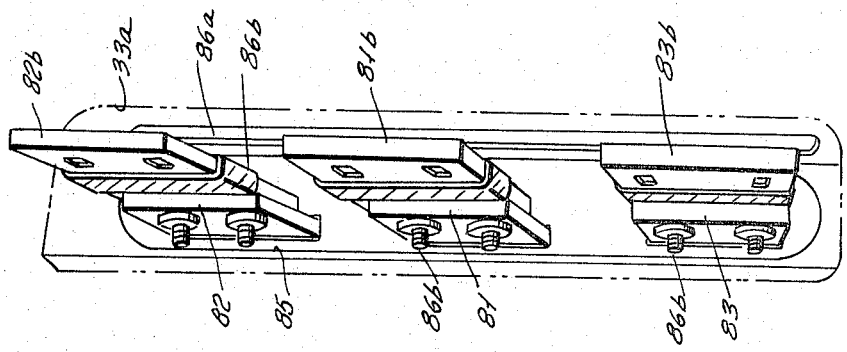
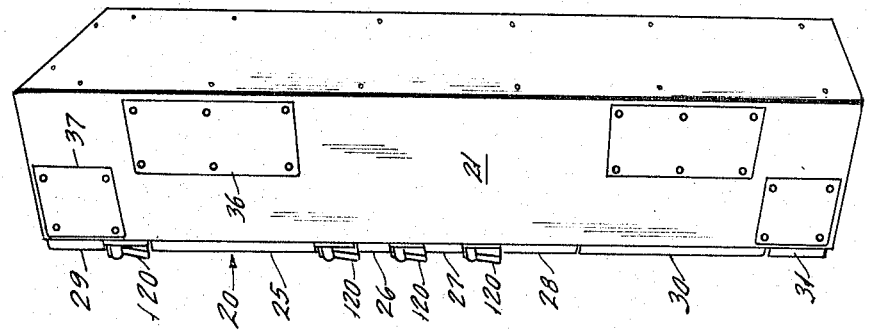
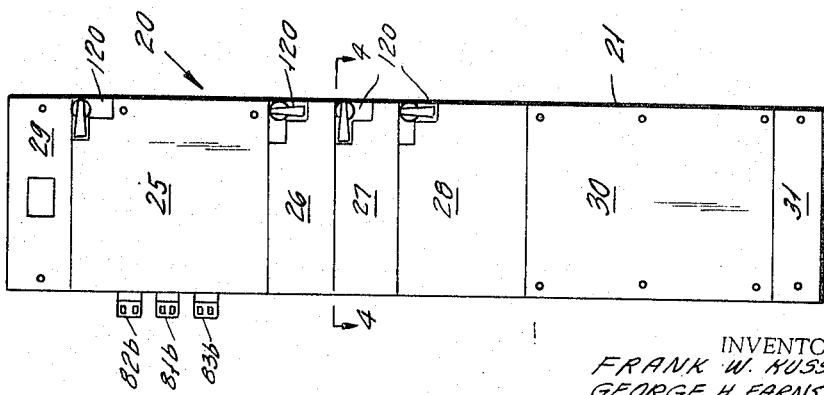
INVENTORS
FRANK W. KUSSY
GEORGE H. FARNSWORTH
BY ROBERT W. THOMAS
OSTROLENK, FABER, GERB & SOFFEN
ATTORNEYS

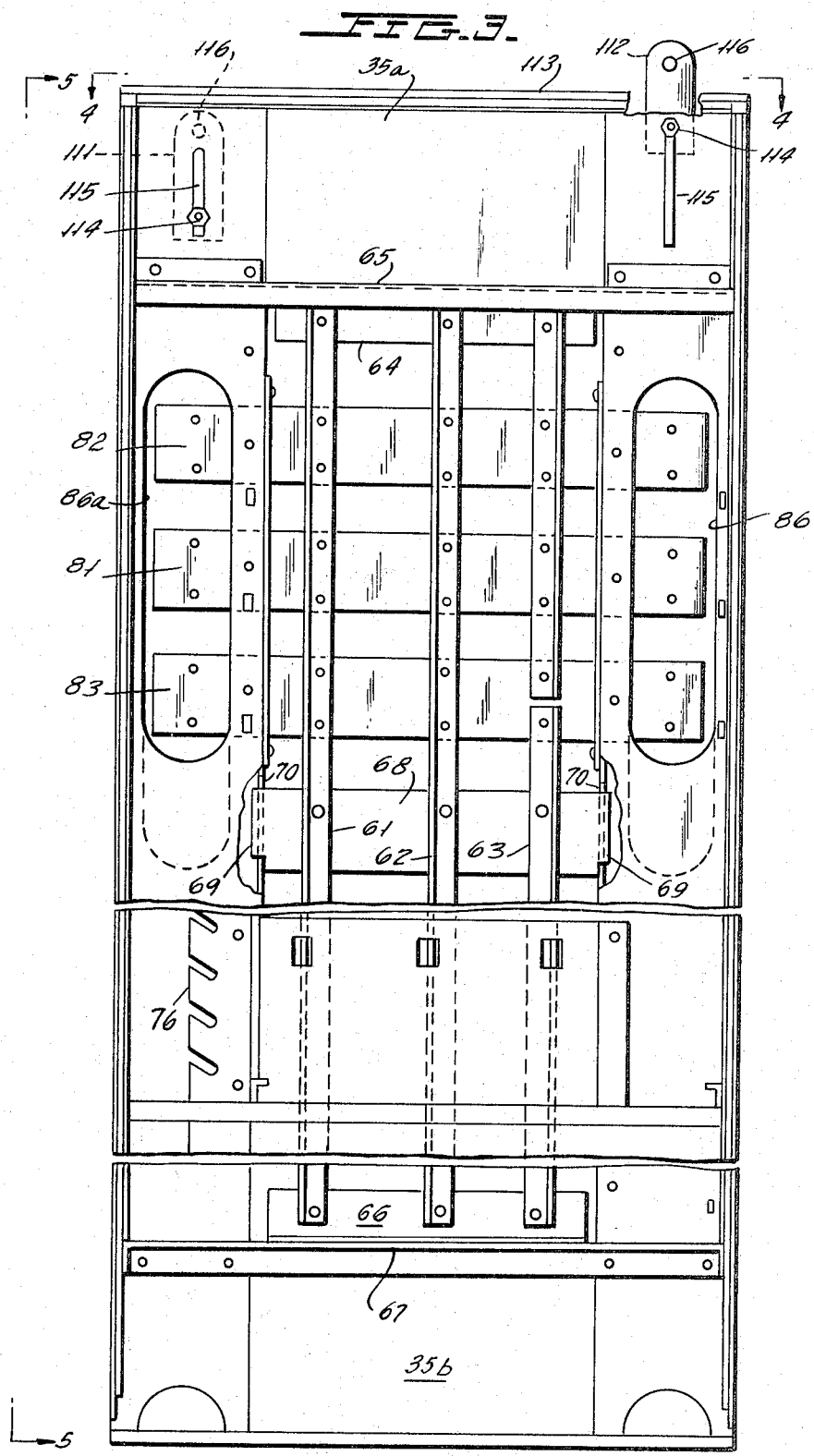

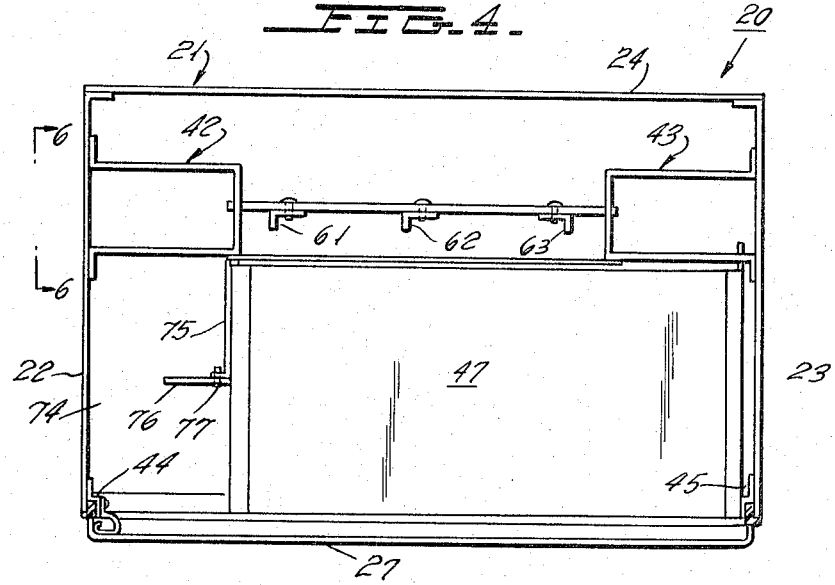
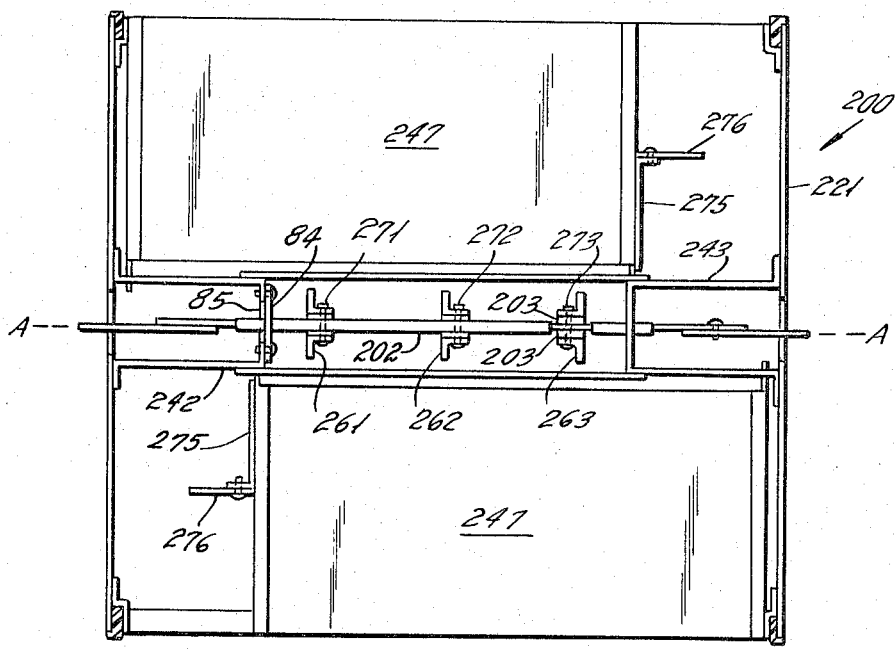

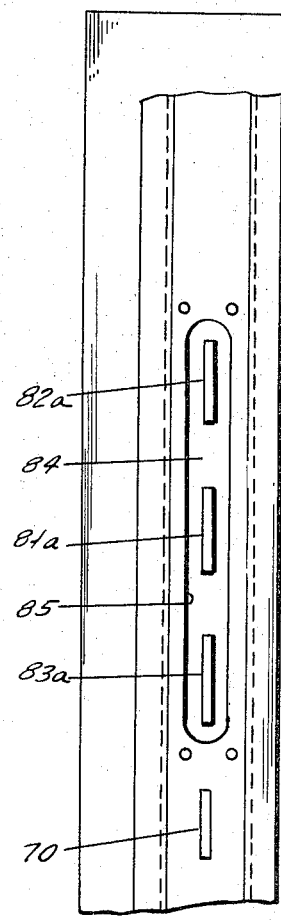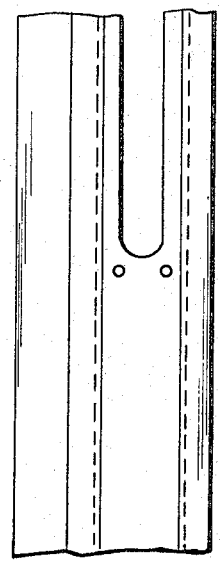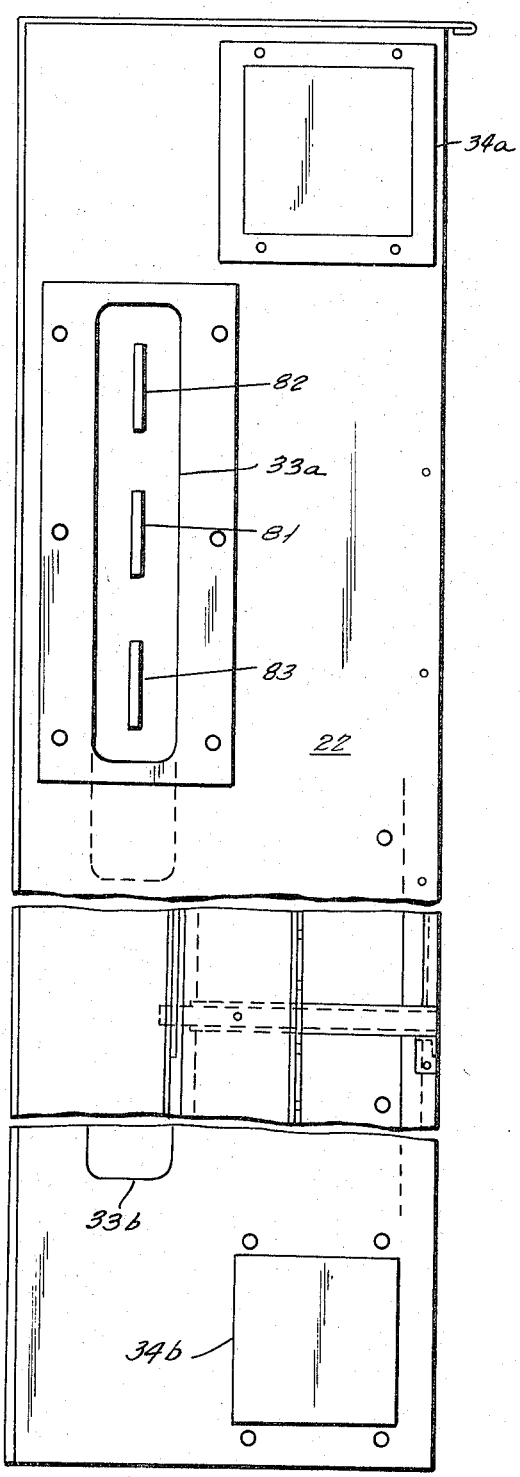

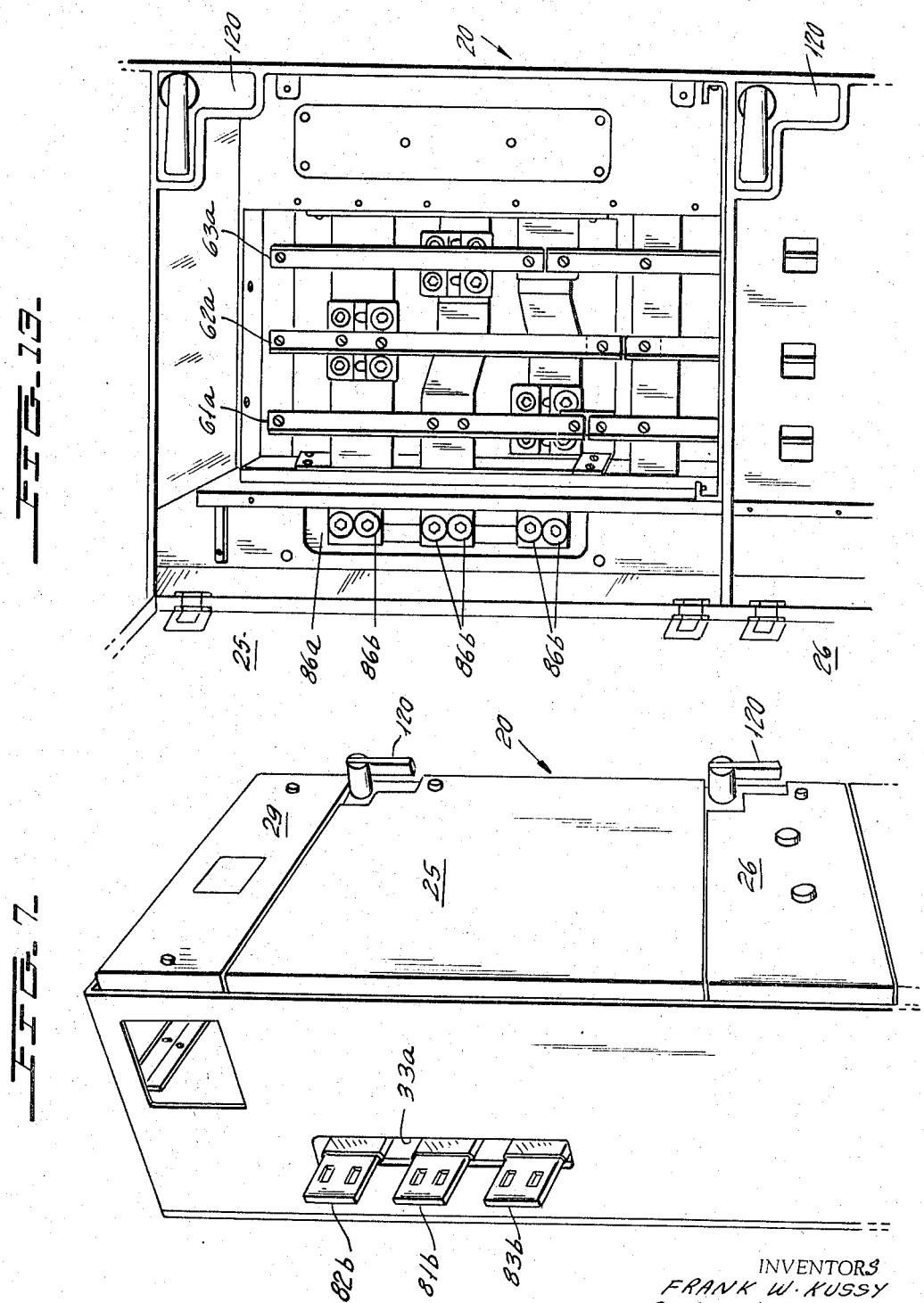

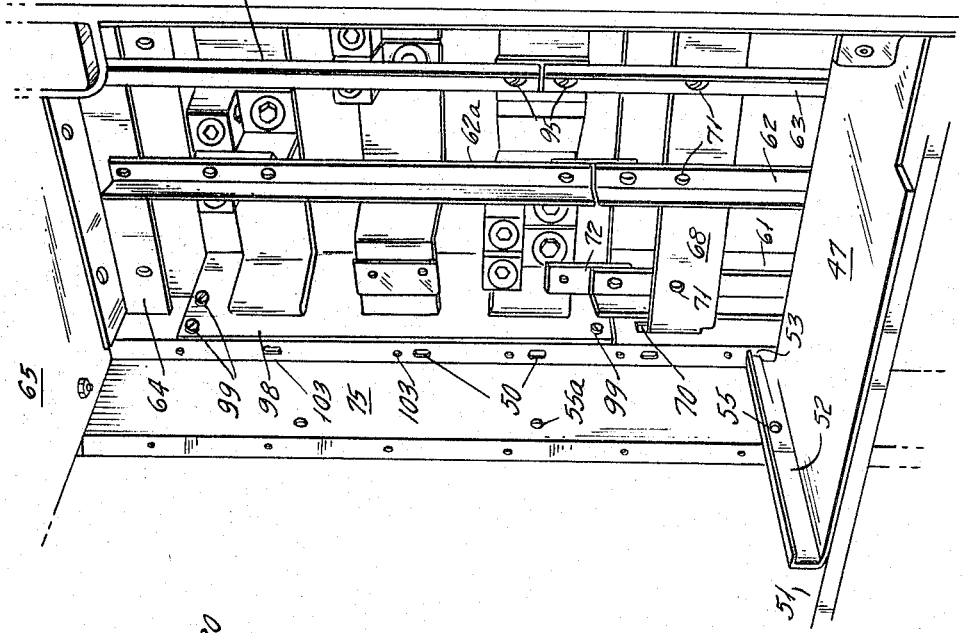
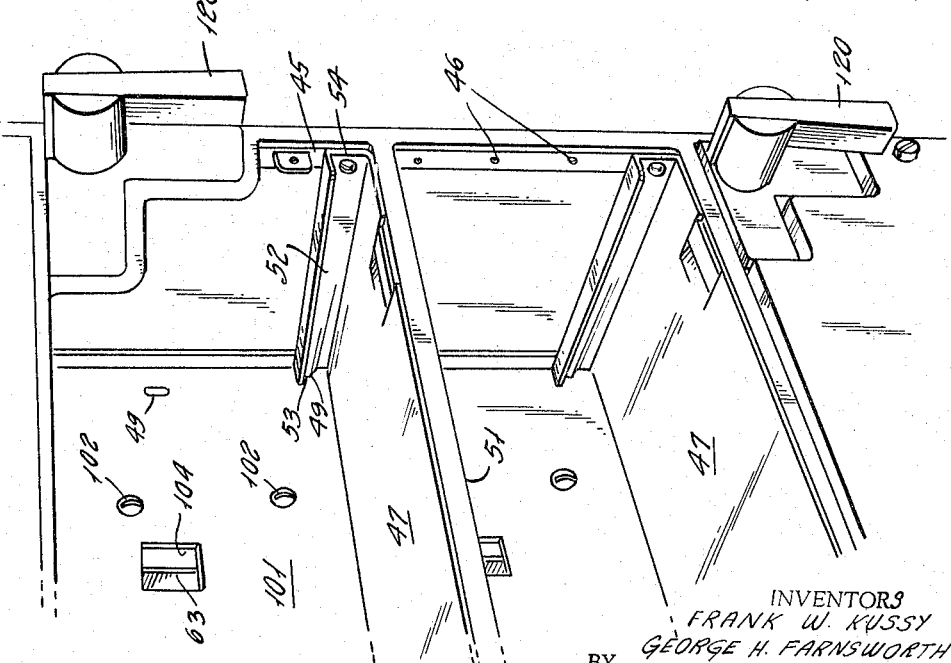

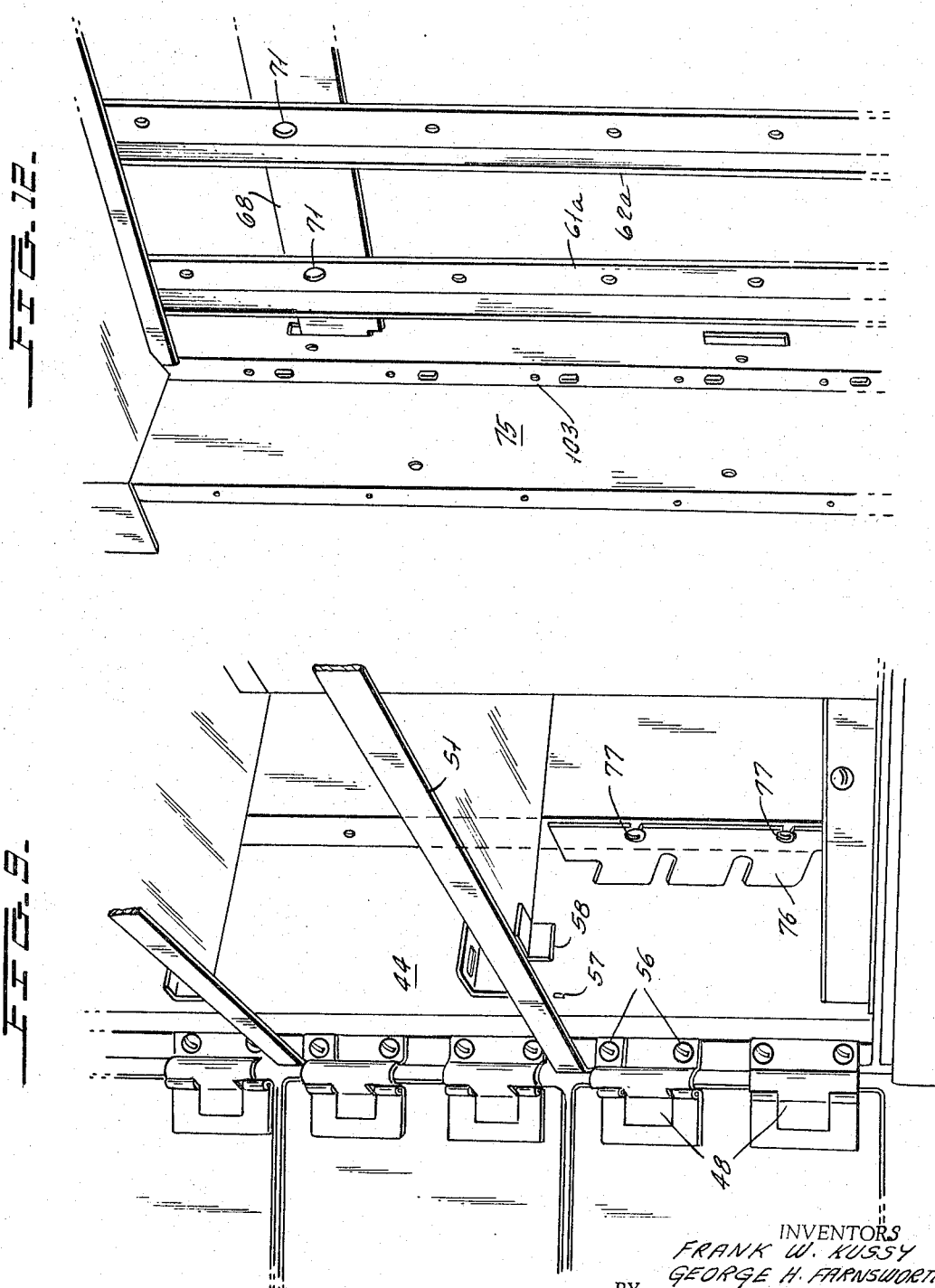

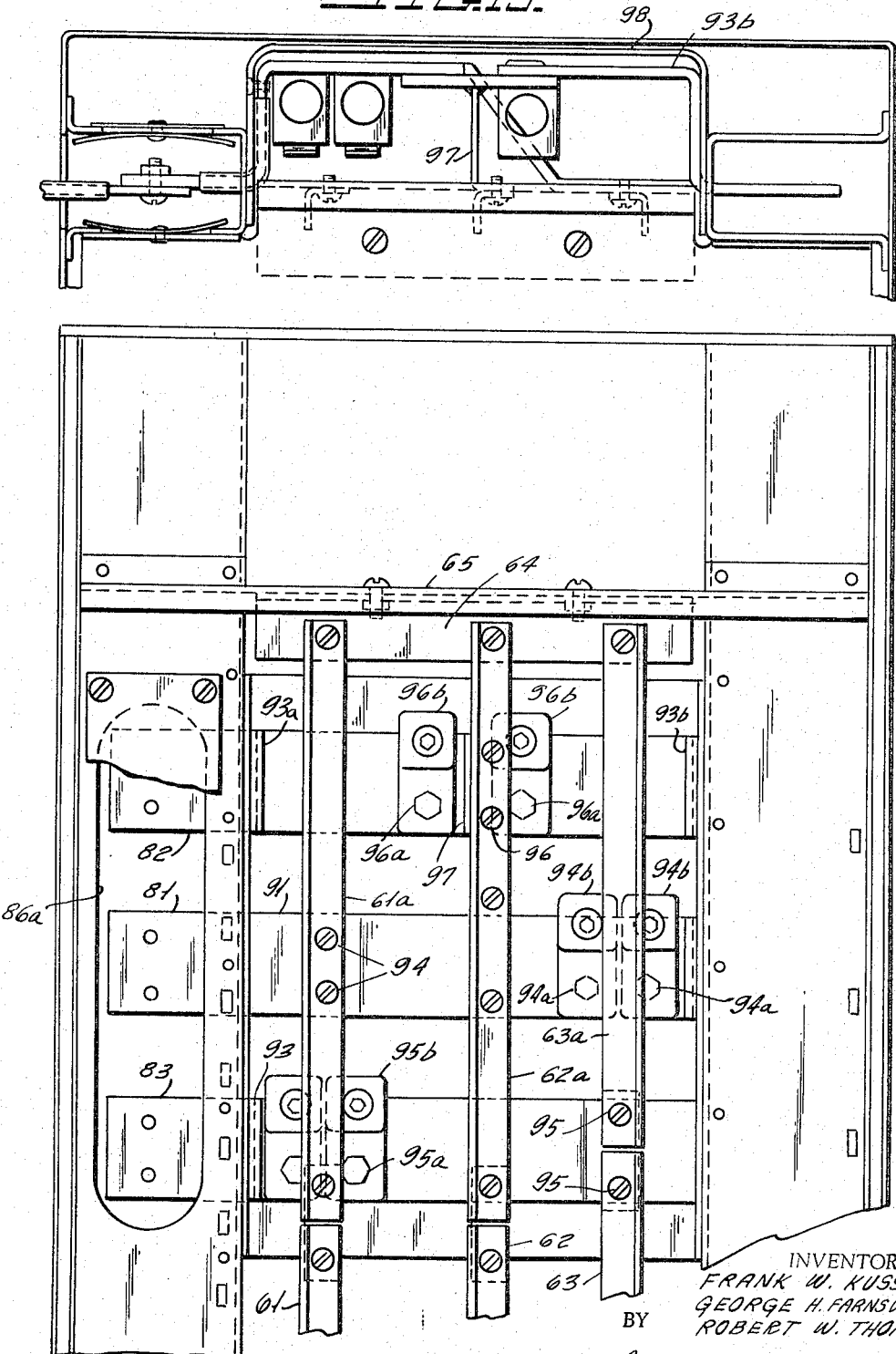

United States Patent Office 3,311,793
Patented Mar. 28, 1967

3,311,793
ELECTRICAL CONTROL CENTER
Frank W. Kussy, Birmingham, George H. Farnsworth, Grosse Pointe Woods, and Robert W. Thomas, St. Clair Shores, Mich., assignors to I-T-E Circuit Breaker Company, Philadelphia, Pa., a corporation of Pennsylvania
Filed Sept. 28, 1964, Ser. No. 399,592
4 Claims. (Cl. 317—120)

This invention relates to means for electric power distribution and in particular relates to control centers having one or more vertical compartments which house circuit interrupters.

In general, a control center of this type is provided with a vertically extending elongated housing having a plurality of vertically extending elongated bus bars mounted therein in parallel, spaced, insulating relationship. Suitable means are provided for introducing power into the control center and connecting same to the bus bars. Means are also provided for mounting circuit control equipment in the control center and making electrical connections from this equipment to the bus bars.

The device of the instant invention is a control center of the general description referred to above in which the bus bars each have an L-shaped configuration with a first leg and a second leg. The first legs are positioned in parallel planes and are intended to be engaged by plug-in fingers projecting from the control apparatus while the second legs are positioned in a common plane. The second legs are provided with apertures having fixed spacings which provide convenience in securing intermediate horizontal support means to the bus bars. This support means usually consists of a purality of flat insulating strips screw connected to the second legs in any chosen vertical spacing depending on the desired short circuit capacity of the bus system. These strips are positioned to the rear of the bus bar first legs and are arranged so that it is possible to make electrical connections from the control apparatus to the bus bars along their entire lengths regardless of the number of supports desired. The L-shaped bus bar design provides a shallow bus bar system thereby allowing greater depth for plug-in type control apparatus and the shallowness of the bus bar system does not detract from the ability of the system to withstand high mechanical forces accompanying short circuit currents.

As will be hereinafter explained in detail, the control center of the instant invention is so constructed that substantially all wiring may be done from the front and it is a simple matter to interconnect adjacent control centers of this construction.

The interior of the control center housing is provided with two longitudinally extending U-shaped channel sections which are secured along the ends of their U-arms to the sides of the enclosure. As will be hereinafter explained, the channel sections provide rigidity for the overall structure and contain suitably positioned apertures and slots and for securement of the bus bar supports and the passage of horizontal bus bars coming from adjacent control centers. An especially large wiring gutter is provided in the space forward of one channel section and a barrier secured to this channel section separates the back of the wiring gutter from the space in the control unit which receives the control apparatus thereby preventing load cables from interfering with insertion or removal of the control apparatus.

Accordingly, a primary object of this invention is to provide a novel control center.

Another object is to provide a novel control center having L-shaped bus bars.

Still another object is to provide a novel control center having shallow and rigid means for supporting the bus bars.

Still another object is to provide a novel control center in which plug-in connections may be made to the bus bars along their entire lengths and in which mechanical supports for the bus bars may be added without disassembly of the control center.

A further object is to provide a novel construction for a control center in which it is extremely convenient to provide a back to back bus bar arrangement so that control apparatus may be plugged in at both the front and back of the control center.

A still further object is to provide a novel control center construction utilizing simple channel members to add strength and to simplify assembly.

Another object is to provide a novel control center in which jumpers and lugs are readily accessible thereby facilitating field work.

These as well as other objects of this invention shall become readily apparent after reading the following description of the accompanying drawings in which:

FIGURE 1 is a front elevation of a control center constructed in accordance with the teachings of the instant invention.

FIGURE 2 is a side elevation of the control center of FIGURE 1.

FIGURE 3 is a front elevation of the control center with the openable covers removed.

FIGURE 4 is a cross section taken through line 4—4 of FIGURE 3 looking in the direction of arrows 4—4.

FIGURE 5 is a side elevation of the control center looking in the direction of arrows 5—5 of FIGURE 3.

FIGURE 6 is a side elevation of one of the U-shaped channel members looking in the direction of arrows 6—6 of FIGURE 4.

FIGURE 7 is a fragmentary side elevation of the control center with covers removed from the upper pull box and side opening for horizontal jumpers.

FIGURES 8, 9 and 10 are fragmentary perspectives showing the manner in which the pans dividing the control center housing into a number of vertically stacked compartments are secured in place.

FIGURE 11 is a fragmentary perspective in the region where the horizontal jumpers pass through the side opening in the control center enclosure.

FIGURE 12 is a fragmentary perspective illustrating the manner in which the bus bar mechanical supports are secured to the bus bars and to the U-shaped channel members of the housing.

FIGURE 13 is a fragmentary front elevation of the control center with the covers in open position and the bus bar shield removed from the upper compartment to reveal main lugs mounted to the cross bussing.

FIGURE 14 is a front elevation in the region of the main lugs of FIGURE 13.

FIGURE 15 is a plan view of the elements shown in FIGURE 14.

FIGURE 16 is a plan view of another embodiment of this invention showing how the basic teachings are employed in back-to-back plug-in arrangement.

Now referring to the figures: A control center may comprise one or more of the sections 20 each of which includes elongated vertically extending enclosure 21 having opposed side walls 22, 23 joined together by rear wall 24. The front of enclosure 21, as shown in FIGURE 1, is provided with four openable covers 25–28 as well as removable plates 29–31. As will hereinafter become apparent, plate 30 may be replaced by one or more openable covers and each of the covers 25 through 28 may be replaced by a removable plate. As will also become apparent, openable covers 26, 27 are each one unit in height while cover 28 is two units in height and cover 25 is three units in height. As best seen in FIGURE 5, wall 22 is provided with upper and lower slots 33a and 33b for the passage of cross bussing between adjacent control center sections and is also provided with upper and lower openings 34a, 34b which communicate with the upper and lower spaces 35a, 35b (FIGURE 3) of enclosure 21 which constitute pull boxes. As best seen in FIGURE 2, cover plates 36 are placed over either or both of the slots 33a, 33b when they are not in use and cover plates 37 are placed over either or both of the pull box openings 34a, 34b when these openings are not being used. Openings similar to slots 33a, 33b and openings 34a, 34b are also provided in the other side wall 23.

Disposed within enclosure 21 are U-shaped channels 42, 43 (FIGURE 4) each provided with outturned portions at the free ends of their U-arms. Channels 42, 43 are welded to enclosure sidewalls 22, 23 respectively along these outturned portions. One leg of each Z-shaped rail 44, 45 is welded to sidewalls 22, 23 respectively adjacent the front edges thereof.

A plurality of threaded apertures 46 (FIGURE 8) extend through another leg of each rail 44, 45 to provide for the convenient mounting of partition trays 47 and cover hinges 48 (FIGURE 9). The forwardly positioned arms of U-shaped channels 42, 43 are each provided with a first series of slots 49 adjacent to the outturned portions (FIGURE 8) and a second series of slots 50 positioned adjacent to the web (FIGURE 10). Each of the trays 47 is provided with an elongated brace 51 (FIGURE 9) which extends along the bottom surface and front edge of tray 47 and extends beyond the left end of tray 47 when viewed from the front of enclosure 21. The ends of each tray are upwardly and inwardly turned to provide guideways 52 (FIGURE 8) to facilitate insertion and removal of control apparatus (not shown).

In order to mount a tray 47 the rearwardly extending tabs 53 (FIGURE 10) at the web portions defining guideways 52 are inserted into slots 49 and 50 of U-shaped channels 42, 43. The right forward end of pan 47 is secured in place by screw 54 received by one of the threaded apertures 46 in the Z-rail 45 (FIGURE 8). The left end of this pan 47 is secured to partition 75 (hereinafter described) by screw 55 (FIGURE 10) entered into partition aperture 55a while the left end of brace 51 is downwardly turned and is secured to Z-rail 44 by screw 56 (FIGURE 9).

The bottom of each tray 47 is provided with a slotted member 57 and a stop member 58 (FIGURE 9) for cooperation with a latching mechanism of the control unit (not shown). Since the control units and their latching mechanisms form no part of the instant invention they will not be described herein. For a description thereof reference is made to application Ser. No. 565,850, filed July 18, 1966, in the name of Kussy et al., for Combination Control Unit, and assigned to the assignee of the instant invention.

Bus bars 61, 62, 63 (FIGURE 4) are elongated members of L-shaped cross-section. One leg of each bus bar 61–63, hereinafter referred to as the mounting leg, extends parallel to the rear wall 24 of enclosure 21 with all of the mounting legs lying in a common plane. The other legs of bus bars 61–63, hereinafter referred to as the power tapping legs, extend forwardly from the mounting legs and parallel to the longitudinal axis of enclosure 21. The upper ends of bus bars 61–63 are secured to one leg of insulating bracket 64 (FIGURES 3, 10, 14) whose other leg is fixedly secured to the underside of partition 65 constituting the bottom boundary for upper pull box 35a. Similarly, the lower ends of bus bars 61–63 are secured to one leg of insulating bracket 66 whose other leg is fixedly secured to the upper surface partition 67 constituting the upper boundary for lower pull box 35b.

It is noted that each of the mounting legs of bus bars 61–63 is provided with a plurality of apertures for the purpose of securement to intermediate supports 68 and the connection of cross bussing. As seen in FIGURE 3 the ends of each of the intermediate supports 68 are notched at the bottom corners so as to provide end projections 69 which extends into elongated slots 70 in the webs of U-shaped channels 42, 43. Screws 71, FIGURE 10 extending through selected ones of the clearance aperture in the individual bus bars 61–63, are received by threaded apertures in intermediate support strip 68 thereby restraining support strip 68 against movement along the axis of enclosure 21. Side to side movement of strip 68 is restrained through its abutment with the webs of channels 42, 43 while front to back movement is restrained by the width of slots 70. For a reason to be hereinafter explained, each of the bus bars 61–63 is split into two longitudinally aligned sections each joined by a splicing means which in the cases of bus bars 61, 62 are individual splice plates 72 (FIGURE 10).

The portion of enclosure 21 to the left of pan 47 constitutes a vertically extending wiring gutter 74 (FIGURE 4) which is partially isolated from the control device spaced above pan 47 by partition 75 and slotted conductor wire retainer 76. Partition 75 is positioned parallel to enclosure walls 22, 23 and is secured to the forward leg of channel 42. Wire retainer 76 is secured by screws 77 to the edge of partition 75 remote from channel 42 and is positioned transverse to partition 75.

In the embodiment of FIGURE 3 horizontally extending cross busses 81–83 are electrically connected to the mounting legs of bus bars 61–63 respectively and extend through slots 81a–83a (FIGURE 6) in insulating sheet 84 which covers elongated slot 85 in the webs of each of the channels 42, 43. The ends of cross busses 81–83 are positioned in alignment with the elongated apertures 86 in the forwardly positioned arms of channels 42, 43. Enclosure opening 33a is aligned with channel slot 86 so that splice busses 81b–83b secured to and extending axially from cross busses 81–83, respectively, pass through enclosure opening 33a (FIGURE 11). It is noted that bolts 86b connecting splice busses 81b–83b to cross busses 81–83, respectively, are accessible through elongated aperture 86a in the forward leg of channel 42. As should now be apparent splice plates 81b–83b may extend into and be connected to similar cross bussing of an identical control center mounted adjacent to control center 20. If the adjacent control center section is energized splice busses 81b–83b and cross busses 81–83 will serve to energize control center section 20.

It may be desirable to provide control center section 20 with cross bussing having terminal lugs as illustrated in FIGURES 10 through 15. In such an event the upper sections 61a–63a of bus bar 61–63, respectively, are removable for the convenience of making such connections. Screws 94 electrically connect bus bar 61 to cross bus 91 while bolts 94a electrically connect terminal lugs 94b to the rearwardly stepped portion of cross bus 91. As illustrated, suitable insulation surrounds the portions of cross bus 91 in the regions adjacent to bus bars 62, 63 as well as the region adjacent to rear wall 24 of enclosure 21.

Similarly, screws 95 electrically connect bus bar 63 to cross bus 93 and bolts 95a electrically connect lugs 95b to cross bus 93. It is noted that cross bus 93 is so positioned that it also acts as a splice plate connecting the upper portion 63a of bus bar 63 to the lower portion thereof. Screws 96 electrically connect bus bar 62 to the free end of the leg of T-shaped member 97. The aligned cross bus sections 93a, 93b are secured to opposite ends of the cross arm of member 97 by bolts 96a which also secure terminal lugs 96b to cross bus sections 93a, 93b. When offset cross bussing is utilized, backwall 24 and the webs of channels 42, 43 are insulated by a U-shaped barrier 98 secured in place by screws 99 (FIGURE 10). Insulating shields 101 at the rear of each pan 47 are secured to channels 42, 43 by clips 102 (FIGURE 8) entered into apertures 103. Thus, it is seen that shields 101 are positioned forward of bus bars 61–63. The shields 101 shown are provided with three apertures 104 aligned in front of the power tapping legs of bus bars 61–63. Apertures 104 provide clearance for stabs of control devices to engage the bus bars 61–63. When the compartment above a particular pan 47 is not going to be utilized for an extended period of time shield 101 shown is replaced by a similar shield (not shown) which does not have any apertures aligned with bus bars 61–63.

Disposed within channels 42, 43 at the upper ends thereof are lifting supports 111, 112 (FIGURE 3) which are extendable through apertures (not shown) in the top 113 of enclosure 21. Each of the lifting supports 111, 112 is slidably secured to the respective channels 42, 43 by means of a bolt 114 which extends into channel slot 115 with the latter acting as a guide for movement of supports 36, 37 in a vertical direction. Bolts 114 are at the lower ends of lifting supports 111, 112 while hook receiving apertures 116 are at the upper ends of supports 111, 112. As seen in FIGURE 3 lifting support 111 is retracted while lifting support 112 is extended so that aperture 116 is in position to receive the hook of an apparatus for lifting the entire control center section 20 during the course of shipping and installation.

Handle mechanisms 120 (FIGURES 1 and 8) shown adjacent to the upper right hand corners of openable covers 25 through 28 are provided as a means for the locking of covers 25 through 28 and also as a means for operating the control apparatus (not shown) disposed in the compartments behind covers 25 through 28. Since these handle mechanisms 120 form no part of the instant invention they will not be described herein but reference is made to the aforesaid application Ser. No. 565,850.

At this time it should be fully appreciated that the L-shaped bus bars 61–63 permit the utilization of a great many intermediate support strips 68 without interfering with the electrical connections to bus bars 61–63. That is, regardless of the number of cross supports 68 required to stabilize the main bus run 61–63 against mechanical forces accompanying short circuits, the entire lengths of the power tapping legs of these bus bars are available for engagement by plug-in fingers of control devices. Further, the L-shaped bus bar configuration is much more rigid than a flat bus bar of the same cross-sectional area. Hence, the overall structure is strengthened.

By utilizing the teachings of the instant invention a back to back configuration with L-shaped bus bars may be readily obtained. As seen in FIGURE 16, L-shaped bus bars 261–263 are positioned substantially in the same locations as bus bars 61–63 of the embodiments previously described. The enclosure of control center 200 is divided into two sections, one positioned above and the other positioned below line A—A which extends through the center of the intermediate supports for bus bars 261–263. Each of these sections includes identically associated U-shaped channels 242, 243, barrier 275 and wire retainer 276. Positioned back to back with bus bars 261–263 are bus bars 271–273, respectively, with the latter group of bus bars being secured to the same intermediate support members as bus bars 261–263 if desired.

The insulation covered cross bus members 202 are slightly thinner than the intermediate support members so that conducting spacers 203 are interposed between the mounting legs of the bus bars and the cross bus at the points where electrical connections are made. Thus, it is seen that in control center 200 both the front and back are open and that the power tapping legs of the bus bars are so positioned that control apparatus may be inserted either through the front or the back. Naturally, openable covers (not shown) are provided for both the front and back of enclosure 221 of control center 200.

Thus, this invention provides a novel construction for a control center in which the making of electrical connections is extremely simple and the making of modifications to the unit for the acceptance of different control apparatus is also simplified. Further, it is a relatively simple matter to add intermediate supports which strengthen the bus run so that it is capable of withstanding high magnitude short circuit currents.

It is also seen that apertures are so provided that a modular construction is produced. That is, the apertures permit the mounting of pans 47 so as to form compartments of a basic height or multiples of this basic height, it being intended that the control apparatus be manufactured in multiples of the basic height.

Although there has been described a preferred embodiment of this novel invention, many variations and modifications will now be apparent to those skilled in the art. Therefore, this invention is to be limited not by the specific disclosure herein, but only by the appending claims.

The embodiments of the invention in which an exclusive property or privilege is claimed are defined as follows:

1. A control center of the class described including an elongated enclosure with opposed sides, and in addition to said sides a back and a front; said front having at lease one openable cover; a plurality of elongated bus bars disposed within said enclosure and extending generally parallel to the longitudinal axis of said enclosure; support means maintaining said bus bars in insulating relationship; each of said bus bars having a first portion engaged by said support means and a second portion extending forward of said first portion for engagement by power tapping stabs of control apparatus; each of said portions extending for substantially the entire length of said bus bars; each of the bus bars being of generally L-shape cross-section with a first and a second leg constituting said first and said second portions, respectively; said first legs positioned in a common plane; said support means including fixed elements of said enclosure secured to said bus bars at opposite ends thereof, fastening means, and at least one elongated plate-like insulating intermediate element positively secured solely to said bus bars by said fastening means; an elongated channel member mounted to each of said sides of said enclosure and having a part extending generally parallel to said sides; said parts having aligned slots; said intermediate element having its ends received by said slots; said intermediate element is comprising a strip extending transverse to said bus bars; said intermediate element being notched at opposite ends of a long edge thereof with the spacing between notches approximating the spacing between the parts of the channels extending generally parallel to said sides of the enclosure, said element being positioned so that said parts block side to side movement of said element.

2. A control center of the class described including an elongated enclosure with opposed sides, and in addition to said sides a back and a front; said front having at least one openable cover; a plurality of elongated bus bars disposed within said enclosure and extending generally parallel to the longitudinal axis of said enclosure; support means maintaining said bus bars in insulating relationship; each of said bus bars having a first portion engaged by said support means and a second portion extending forward of said first portion for engagement by power tapping stabs of control apparatus; each of said portions extending for substantially the entire length of said bus bars; each of the bus bars being of generally L-shape cross-section with a first and a second leg constituting said first and said second portions, respectively; said first legs positioned in a common plane; said support means including fixed elements of said enclosure secured to said bus bars at opposite ends thereof, fastening means, and at least one elongated plate-like insulating intermediate element positively secured solely to said bus bars by said fastening means; an elongated channel member of generally U-shaped cross-section mounted to each of said sides of said enclosure and having a web part extending generally parallel to and spaced from said sides; said intermediate element having its ends in engagement with said parts; cross-bus means connected to the first portion of each of said bus bars and positioned to the rear thereof; said cross-bus means including one section secured directly to said bus bars and a second section extending through aligned openings in one of said parts and the side of the enclosure nearest to said one part; another fastening means connecting said sections; said channel member including another part extending generally parallel to the back of said enclosure; said another part being positioned forward of said cross-bus means and having an aperture aligned with said another fastening means whereby the latter is accessible from the front of the enclosure.

3. A control center of the class described including an elongated enclosure with opposed sides, and in addition to said sides a back and a front; said front having at least one openable cover; a plurality of elonagted bus bars disposed within said enclosure and extending generally parallel to the longitudinal axis of said enclosure; support means maintaining said bus bars in insulating relationship; each of said bus bars having a first portion engaged by said support means and a second portion extending forward of said first portion for engagement by power tapping stabs of control apparatus; each of said portions extending for substantially the entire length of said bus bars; said support means including fixed elements of said enclosure secured to said bus bars at opposite ends thereof, fastening means, and at least one intermediate element positively secured to said bus bars by said fastening means; an elongated channel member mounted to each of said sides of said enclosure and having a part extending generally parallel to said sides; said parts having aligned slots; said intermediate element having its ends received by said slots; said intermediate element extending transverse to said bus bars and being notched at opposite ends of a long edge thereof with the spacing between notches approximating the spacing between the parts of the channels extending generally parallel to said sides of the enclosure, said element being positioned so that said parts block side to side movement of said element.

4. A control center of the class described including an elongated enclosure with opposed sides, and in addition to said sides a back and a front; said front having at least one openable cover; a plurality of elongated bus bars disposed within said enclosure and extending generally parallel to the longitudinal axis of said enclosure; support means maintaining said bus bars in insulating relationship; each of said bus bars having a first portion engaged by said support means and a second portion extending forward of said first portion for engagement by power tapping stabs of control apparatus; each of said portions extending for substantially the entire length of said bus bars; said support means including fixed elements of said enclosure secured to said bus bars at opposite ends thereof, fastening means, and at least one intermediate element positively secured to said bus bars by said fastening means; an elongated channel member mounted to each of said sides of said enclosure and having a part extending generally parallel to said sides; said intermediate element having its ends in engagement with said parts; cross-bus means connected to the first portion of each of said bus bars and positioned to the rear thereof; said cross-bus means extending through aligned openings in one of said parts and the side of the enclosure nearest to said one part; said cross-bus means including one section secured directly to said bus bars and a second section extending through said aligned openings; another fastening means connecting said sections; said channel member including another part extending generally parallel to the back of said enclosure; said another part being positioned forward of said cross-bus means and having an aperture aligned with said another fastening means whereby the latter is accessible from the front of the enclosure.

References Cited by the Examiner
UNITED STATES PATENTS

| | | | |
|---|---|---|---|
| 2,306,353 | 12/1942 | Cole et al. | |
| 2,542,853 | 2/1951 | Wills | 317—120 |
| 2,997,629 | 8/1961 | Wolski | 317—120 |
| 3,041,506 | 6/1962 | Schlessel et al. | 317—120 |
| 3,227,928 | 1/1966 | Erickson | 317—119 |

ROBERT K. SCHAEFER, *Primary Examiner.*

W. C. GARVERT, H. O. JONES, *Assistant Examiners.*